United States Patent
Rupp

(10) Patent No.: US 12,233,928 B2
(45) Date of Patent: Feb. 25, 2025

(54) SWIVEL SUPPORT DEVICE FOR USE WITH A WHEELBARROW

(71) Applicant: Henrik P Rupp, Hudson Falls, NY (US)

(72) Inventor: Henrik P Rupp, Hudson Falls, NY (US)

(*) Notice: Subject to any disclaimer, the term of this patent is extended or adjusted under 35 U.S.C. 154(b) by 0 days.

(21) Appl. No.: 17/983,413

(22) Filed: Nov. 9, 2022

(65) Prior Publication Data

US 2024/0149933 A1    May 9, 2024

(51) Int. Cl.
*B62B 3/08* (2006.01)
*B62B 3/12* (2006.01)

(52) U.S. Cl.
CPC . *B62B 3/08* (2013.01); *B62B 3/12* (2013.01)

(58) Field of Classification Search
CPC .... B62B 3/08; B62B 3/12; B62B 1/02; B62B 1/04; B62B 1/08; B62B 1/18; B62B 1/186; B62B 1/20
USPC .......................................................... 298/2
See application file for complete search history.

(56) References Cited

U.S. PATENT DOCUMENTS

| | | | | |
|---|---|---|---|---|
| 1,137,329 A * | 4/1915 | Johnson | ........................ | 188/74 |
| 2,345,442 A * | 3/1944 | Winter | .................. | B60B 33/021 |
| | | | | 188/77 R |
| 2,905,275 A * | 9/1959 | Kostolecki | ............ | B60B 33/021 |
| | | | | 188/74 |
| 3,942,608 A * | 3/1976 | Frank | .................... | B60B 33/021 |
| | | | | 188/74 |
| 3,985,208 A * | 10/1976 | Libhart | ..................... | B62B 5/04 |
| | | | | 16/35 R |
| 4,052,079 A * | 10/1977 | Lehman | ................... | B62B 1/186 |
| | | | | 280/476.1 |
| 4,077,087 A * | 3/1978 | Mooney | ................ | B60B 33/021 |
| | | | | 16/35 R |
| 4,449,268 A * | 5/1984 | Schnuell | ............. | B60B 33/0078 |
| | | | | 16/35 R |
| D288,285 S * | 2/1987 | Simmons | ..................... | 188/1.12 |
| 4,767,128 A | 8/1988 | Terhune | | |
| 4,955,625 A | 9/1990 | Herndon | | |
| 5,031,926 A * | 7/1991 | Wannamaker | ............ | B62B 1/20 |
| | | | | D34/16 |
| 5,820,143 A * | 10/1998 | Rigo | ..................... | B65F 1/1468 |
| | | | | 280/47.26 |
| 6,220,622 B1 * | 4/2001 | Garcia | ...................... | B62B 1/20 |
| | | | | 298/2 |

(Continued)

FOREIGN PATENT DOCUMENTS

| | | | | |
|---|---|---|---|---|
| AU | 9210941 A * | 8/1992 | ............ | B62B 1/002 |
| CA | 2324122 A1 * | 12/2001 | | |

(Continued)

*Primary Examiner* — Hilary L Gutman
(74) *Attorney, Agent, or Firm* — Mark A. McCormick

(57) ABSTRACT

A swivel support device to attach to the rear support legs of a conventional wheelbarrow to provide wheeled support that moves in all directions but does not require the user to bear an elevated weight of the wheelbarrow or its load. The device includes two (2) caster assemblies, two (2) spacer blocks, and a connecting platform. The connecting platform is envisioned to be manufactured from a laminated wood board or a fiberglass reinforced plastic (FRP) plank. The overall dimensions of the connecting platform will vary per application.

14 Claims, 5 Drawing Sheets

(56) References Cited

U.S. PATENT DOCUMENTS

| | | | |
|---|---|---|---|
| 6,241,276 B1* | 6/2001 | Wilburn | B62B 1/20 |
| | | | 280/659 |
| 6,508,478 B1* | 1/2003 | Ortez | B62B 1/20 |
| | | | 280/653 |
| 7,845,654 B2 | 12/2010 | Price, Jr. | |
| 7,934,728 B2 | 5/2011 | Strobel | |
| 9,296,404 B1* | 3/2016 | Bell | B62B 1/002 |
| 10,525,996 B1* | 1/2020 | Donald | B62B 1/20 |
| 10,807,626 B2 | 10/2020 | Price | |
| 2003/0201616 A1* | 10/2003 | Friel | B62B 1/20 |
| | | | 280/47.31 |
| 2005/0134012 A1* | 6/2005 | Kan | B62B 3/08 |
| | | | 280/47.34 |
| 2007/0194544 A1* | 8/2007 | Price | B62B 3/02 |
| | | | 280/47.34 |
| 2021/0039702 A1* | 2/2021 | Kutsuna | B62B 3/08 |

FOREIGN PATENT DOCUMENTS

| | | | | |
|---|---|---|---|---|
| DE | 29701857 U1 * | 10/1997 | | B62B 1/20 |
| DE | 20016212 U1 * | 12/2000 | | B62B 1/002 |
| DE | 202012103408 U1 * | 1/2013 | | B62B 1/186 |
| JP | 10001056 A * | 1/1998 | | B62B 1/18 |
| KR | 20140066870 A * | 6/2014 | | |

\* cited by examiner

SWIVEL SUPPORT DEVICE FOR USE WITH A WHEELBARROW

FIELD OF THE INVENTION

This invention relates to a wheelbarrow. In particular, this invention relates to a device attached to the wheels of a wheelbarrow for support.

BACKGROUND

A wheelbarrow is a small hand-propelled vehicle, usually with just one wheel, designed to be pushed and guided by a single person using two handles at the rear, or by a sail to push the ancient wheelbarrow by wind. The term "wheelbarrow" is made of two words: "wheel" and "barrow." "Barrow" is a derivation of the Old English "barew" which was a device used for carrying loads.

The wheelbarrow is designed to distribute the weight of its load between the wheel and the operator, so enabling the convenient carriage of heavier and bulkier loads than would be possible were the weight carried entirely by the operator. As such it is a second-class lever. Traditional Chinese wheelbarrows, however, had a central wheel supporting the whole load. Use of wheelbarrows is common in the construction industry and in gardening. Typical capacity is approximately 100 liters (3.53 cubic feet) of material.

A two-wheel type is more stable on level ground, while the almost universal one-wheel type has better maneuverability in small spaces, on planks, in water, or when tilted ground would throw the load off balance. The use of one wheel also permits greater control of the deposition of the load upon emptying.

With the design of the current wheelbarrow to move a wheelbarrow from side to side or in any other direction other than straight the user must lift or bear the weight of the wheelbarrow and the load during the movement. This may be difficult for users with physical limitations.

Accordingly, and in light of the foregoing, it would be desirable to have a wheelbarrow that is able to move side to side or in any direction along a three hundred sixty-degree path without a user lifting or bearing the weight of the wheelbarrow and load.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
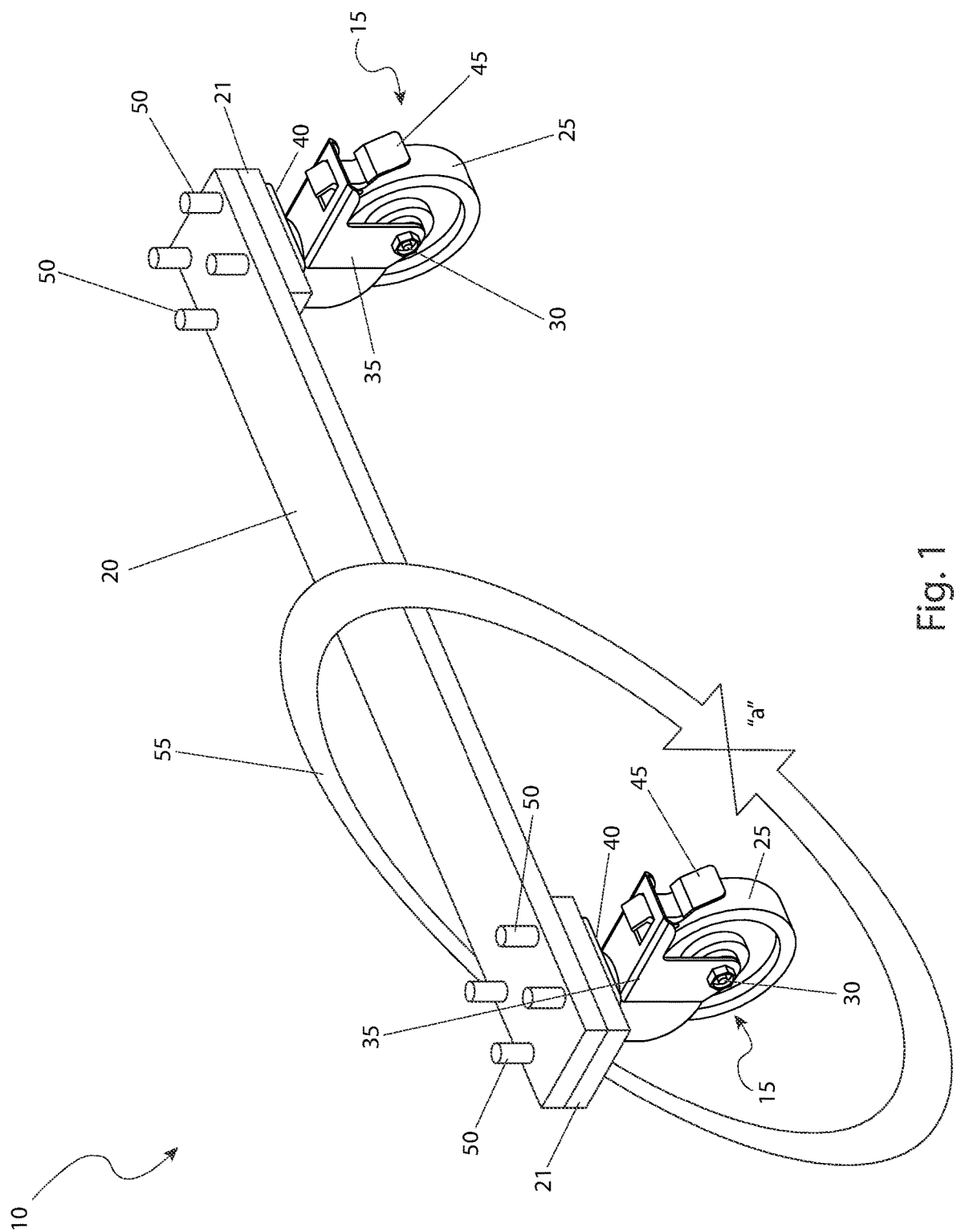
FIG. 1 is a pictorial view of the swivel support device 10, according to the preferred embodiment of the present invention.

DESCRIPTIVE KEY 10 swivel support device
15 caster assembly
20 connecting platform
21 spacer block
25 wheel
30 axle
35 yoke
40 swivel base
45 locking lever
50 attachment means
55 travel path "a"
60 wheelbarrow
65 rear support leg
70 front wheel
75 carrying handle
80 container
85 brace
90 clamp assembly
100 U-bolt
105 threaded end section
110 backing plate
115 nut
120 user
125 load
130 grade
135 motion path "s"
140 motion path "f"

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a pictorial view of the swivel support device 10, according to the preferred embodiment of the present invention is disclosed. The swivel support device (herein also described as the "device") 10, is particularly configured to attach to the rear support legs 65 of a conventional wheelbarrow 60 to provide wheeled support that moves in all directions but does not require the user 120 to bear an elevated weight of the wheelbarrow 60 or its load 125.

The device 10 includes two (2) caster assemblies 15, two (2) spacer blocks 21, and a connecting platform 20. The connecting platform 20 is envisioned to be manufactured from a laminated wood board or a fiberglass reinforced plastic (FRP) plank. The overall dimensions of the connecting platform 20 will vary per application. However, a typical size is envisioned as twenty-four inches (24 in.) long, four inches (4 in.) wide and three-quarters of an inch (¾ in.) thick. A pair of spacer blocks 21 are each attached to distal bottom ends of the connecting platform 20. The spacer blocks 21 preferably have a thickness and width coextensive with the thickness and width of the connecting platform 20 but terminate at a length generally coextensive with the width thereof.

The caster assemblies 15 comprise a large wheel 25 allowing for use on rough terrain, a central axle 30, a yoke 35, a swivel base 40, a locking lever 45 and an attachment means 50. The attachment means 50 may be a screw, a bolt and nut, a rivet, or similar means. The exact method of attachment means 50 is not intended to be a limiting factor of the present invention. The wheel 25 and the axle 30, working in conjunction with the swivel base 40 allows for movement of the device 10 in any direction along a three hundred sixty degree (360°) travel path "a" 55. The locking lever 45 provides a means for stabilizing the wheel 25 and restricting motion when desired. The addition of the caster assemblies 15 provide an overall height of approximately six inches (6 in.).

Figure 2:
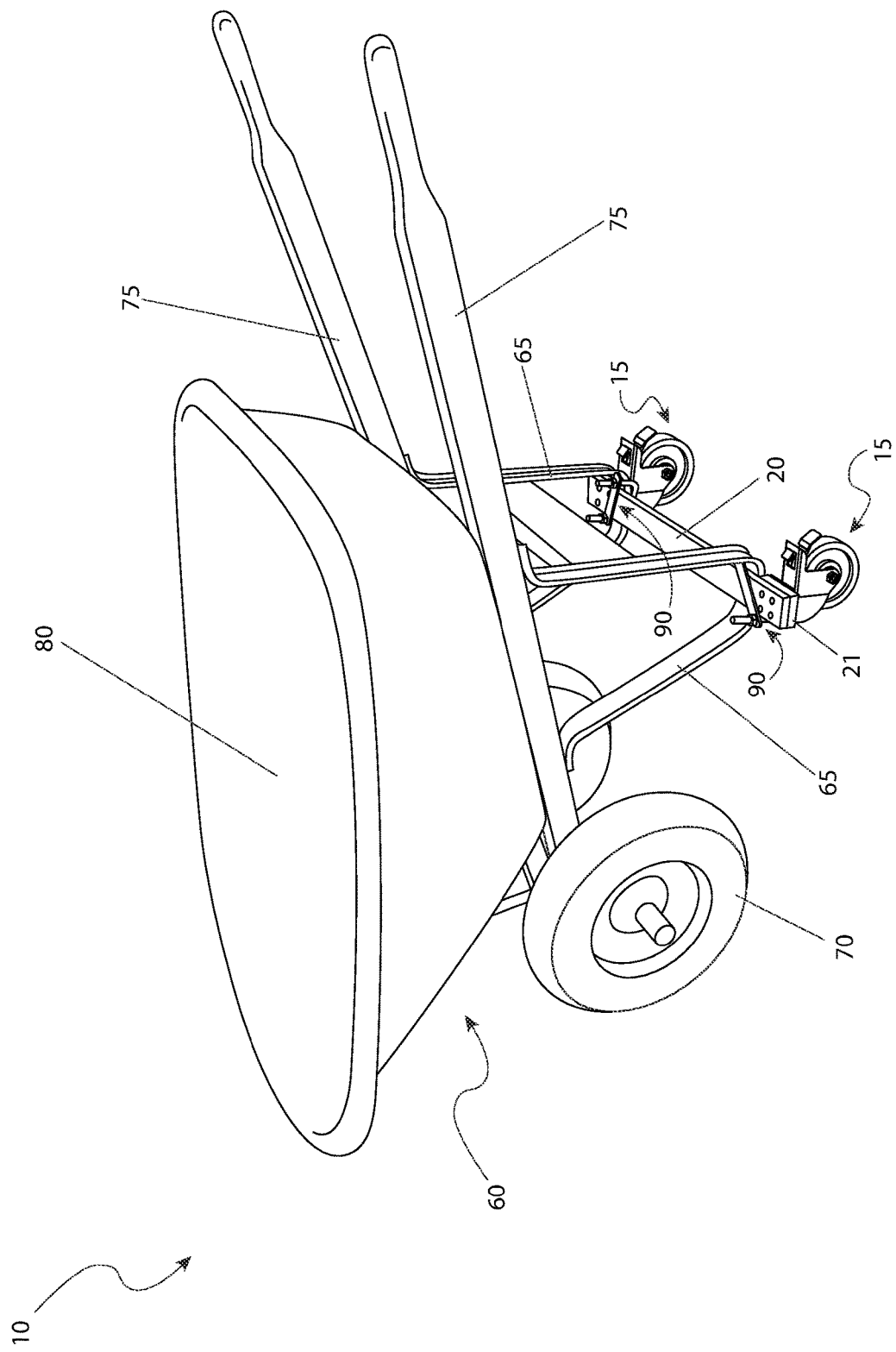
FIG. 2 is a pictorial view of the swivel support device 10 installed on a wheelbarrow 60, according to the preferred embodiment of the present invention.

Referring next to FIG. 2, a pictorial view of the device 10, installed on a wheelbarrow 60, according to the preferred embodiment of the present invention is depicted. The wheelbarrow 60 is depicted as a conventional single wheel wheelbarrow 60 commonly used in construction, landscaping, and other similar tasks. Other types of wheelbarrows 60 such as dual-wheel wheelbarrows 60, and wheelbarrows 60 of different sizes may also be used with the teachings of the device 10, and as such, should not be interpreted as a limiting factor of the present invention.

The wheelbarrow 60 is provided with two (2) rear support legs 65, at least one (1) front wheel 70, two (2) carrying handles 75 and a material container 80. The connecting platform 20 of the device 10 is mechanically coupled to each of the two (2) rear support legs 65 of the wheelbarrow 60. When the device 10 is coupled to the wheelbarrow 60, the spacer blocks 21 shall reside on the outside of the respective rear support leg 65 of the wheelbarrow 60. The device 10 is installed in such a manner as to enable the weight born by the rear support legs 65 to be transferred to the caster assemblies 15 of the device 10. All other operational aspects of the wheelbarrow 60, including movement, weight capacity, dumping process, and the like remain unchanged. Further detail on the mechanical connection of the device 10 to the wheelbarrow 60 will be provided herein below.

Figure 3:
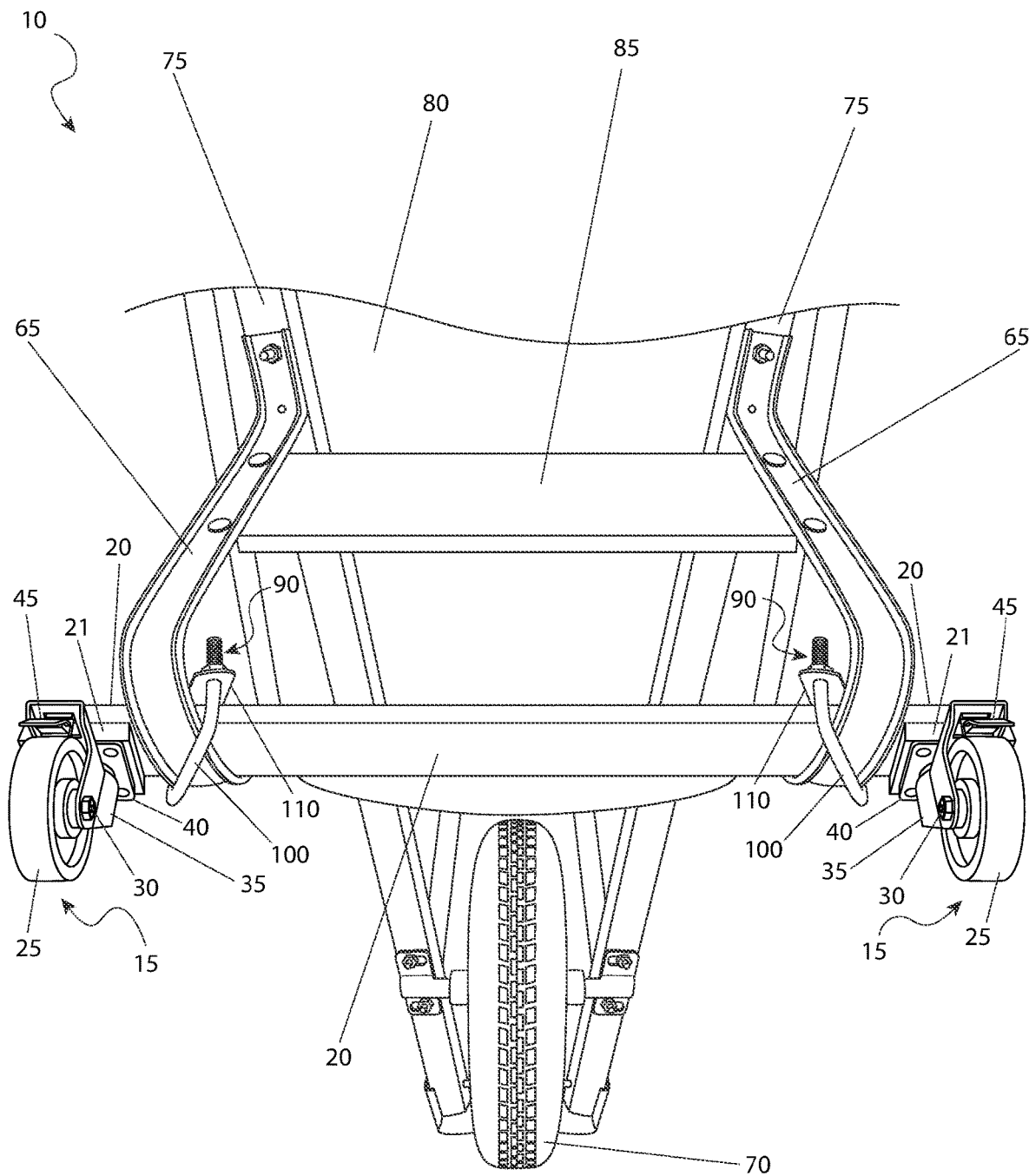
FIG. 3 is a bottom view of the swivel support device 10 installed on a wheelbarrow 60, according to the preferred embodiment of the present invention.

Referring now to FIG. 3, a bottom view of the device 10, installed on a wheelbarrow 60, according to the preferred embodiment of the present invention is shown. This view discloses the appearance of the wheelbarrow 60 from the bottom with the device 10 attached. A brace 85 may be used to connect the rear support legs 65 together and reside vertically between the container 80 and the device 10. The rear support legs 65 are mechanically coupled to the carrying handles 75 as expected. The carrying handles 75 also provide a structural attachment point for the front wheel 70 as expected. The connecting platform 20, with the two (2) caster assemblies 15 attached, are connected to the rear support legs 65 via use of clamp assembly 90 on each rear support leg 65. Further description of the clamp assembly 90 will be provided herein below. It is noted however, that other alternate means of attaching the device 10 to the rear support legs 65 of the wheelbarrow 60 may be utilized, and as such, the use of the clamp assembly 90 should not be interpreted as a limiting factor of the present invention.

Figure 4:
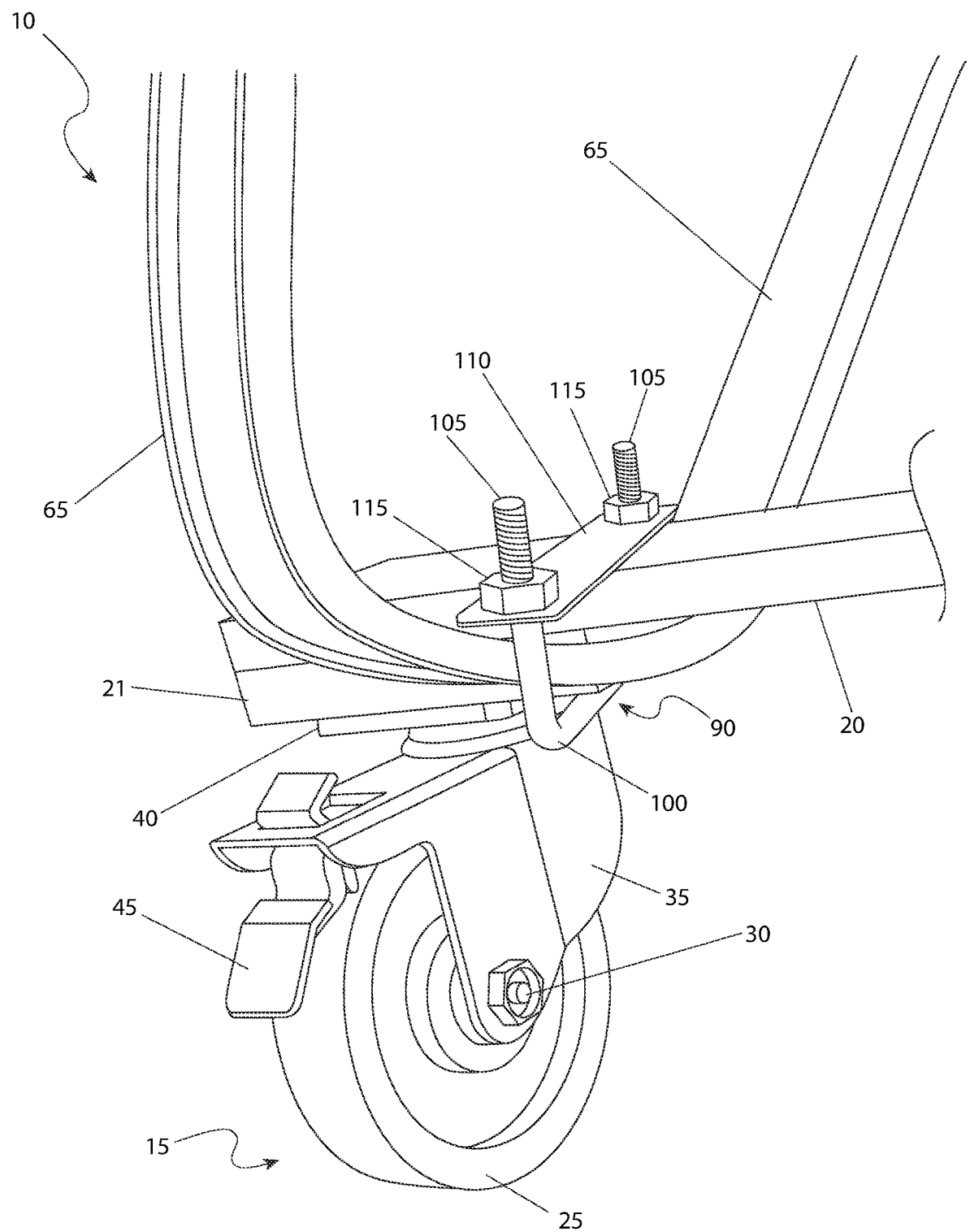
FIG. 4 is a close-up perspective view of the swivel support device 10, as seen along a line I-I, as shown in FIG. 3, according to the preferred embodiment of the present invention; and, FIG. 5 is a pictorial view of the swivel support device 10, installed on caster assemblies 15, shown in a utilized state, according to the preferred embodiment of the present invention.

Referring next to FIG. 4, a close-up perspective view of the device 10, as seen along a line I-I, as shown in FIG. 3, according to the preferred embodiment of the present invention is disclosed. This figure provides additional clarification on the functionality of the clamp assembly 90 and the second spacer block 95 with the caster assemblies 15. The clamp assembly 90 comprises a U-bolt 100 with two (2) threaded end sections 105 that works in conjunction with a backing plate 110 to capture the connecting platform 20 and the rear support legs 65. A set of two (2) nuts 115, on each threaded end section 105, are then tightened to complete the installation. It is envisioned that a particular method of installation is to ensure that the U-bolt 100 and backing plate 110 of each clamp assembly 90 crosses over the rear support leg so that a first threaded end section 105 resides on an inner side of the respective rear support leg 65 and a second threaded end section 105 resides on an outer side of the respective rear support leg 35.

Figure 5:
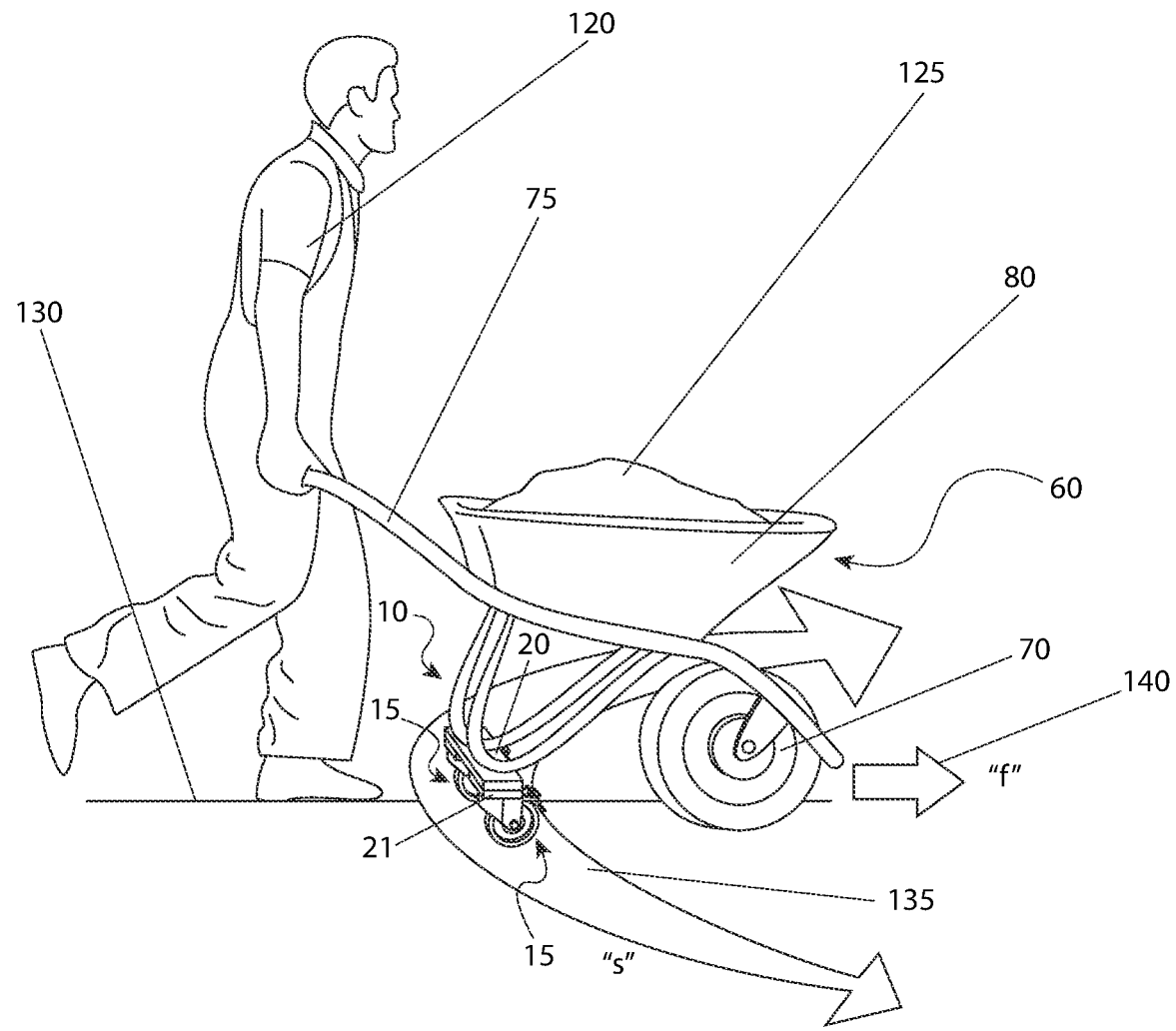

Referring to FIG. 5, a pictorial view of the device for wheelbarrow 10, installed on a caster assembly 15, shown in a utilized state, according to the preferred embodiment of the present invention is depicted. A user 120 may lift the wheelbarrow 60 by the carrying handles 75 and propel the wheelbarrow 60 via the front wheel 70 in a customary manner with or without a load 125 in the container 80. Additionally, the user 120 may rest the wheelbarrow 60 on the device 10 via the rear support legs 65, thus providing three (3) points of contact via the front wheel 70 and the two (2) caster assemblies 15 against grade 130. Due to the travel path "a" 55 (as shown in FIG. 1), the user 120 may move the wheelbarrow 60 along a side-to-side motion path "s" 135 without having to lift or bear the weight of the wheelbarrow 60 and the load 125. This allows a user 120 who may suffer from diminished physical strength to operate a wheelbarrow 60 along a forward motion path "f" 140 as well with the only requirement of having to push the wheelbarrow 60 while being relieved of the requirement of lifting the wheelbarrow 60. It is noted that if the grade 130 is at an angle, and the user 120 does not wish for the wheelbarrow 60 to move unattended, the locking lever 45 of either or both caster assemblies 15 (as shown in FIG. 1) may be engaged.

2. Operation of the Preferred Embodiment

The preferred embodiment of the present invention can be utilized by the common user 120 in a simple and effortless manner with little or no training. It is envisioned that the device 10 would be constructed in general accordance with FIG. 1 through FIG. 5. The user 120 would procure the device 10 from conventional procurement channels such as hardware stores, home improvement stores, mechanical supply houses, mail order and internet supply houses and the like. Special attention would be paid to the exact size of the connecting platform 20 such that it fits the span of the rear support legs 65.

After procurement and prior to utilization, the device 10 would be installed upon the wheelbarrow 60 in the following manner: the wheelbarrow 60 without a load 125 would be inverted as shown in FIG. 3; and the connecting platform 20 would be placed against the rear support legs 65 and secured with the clamp assembly 90. The U-bolt 100 works in conjunction with the backing plate 110 of an individual clamp assembly 90 to capture the connecting platform 20 across both sides of a respective rear support leg 65. The two (2) nuts 115 are installed on each threaded end section 105 and can be tightened by hand to complete the installation, as no tools are needed for installation.

During utilization of the device 10, the user 120 may lift the wheelbarrow 60 by the carrying handles 75 and propel the wheelbarrow 60 via the front wheel 70 in a customary manner with or without a load 125 in the material container 80. The user 120 may rest the wheelbarrow 60 on the device 10 via the rear support legs 65, thus providing three (3) points of contact via the front wheel 70 and the two (2) caster assemblies 15 against grade 130. The user 120 may move the wheelbarrow 60 along a side-to-side motion path "s" 135 without having to lift or bear the weight of the wheelbarrow 60 and the load 125. Should the grade 130 be at an angle and the user 120 does not wish for the wheelbarrow 60 to move unattended, the locking lever 45 of either or both of the caster assemblies 15 may be engaged.

After use of the device 10, it may be left in place for future use or removed by reversing the above process. Removal of the device 10 will not leave any tell-tale marks on the rear support legs 65 nor the wheelbarrow 60, nor impact future use of the wheelbarrow 60 in a conventional manner. Such a feature is envisioned as beneficial for use on wheelbarrow 60 that may be rented.

The features of the device 10 provided the following benefits: no tools are required to install or remove; an easy and effortless three hundred sixty degree (360°) turning of the wheelbarrow 60 and any load 125; immobilization of the caster assemblies 15 via the locking lever 45 prevent unwanted or unattended movement of the wheelbarrow 60 with or without a load 125; a safer operation of the wheelbarrow 60 as it is better balanced on the device 10; the ability to move a heavier load 125 without lifting the rear support legs 65 off of the grade 130; and, the ability for user 120 who may suffer from diminished strength to operate a wheelbarrow 60 with or without a load 125.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A swivel support device for providing wheeled support of a wheelbarrow that moves along a linear path, the device consisting of:
    a connecting platform;
    two spacer blocks, each of the spacer blocks is coupled to the distal ends of the connecting platform, and wherein one of the two spacer blocks is coupled to the bottom of a second end of the connecting platform;
    two caster assemblies, each of the caster assemblies has large wheel, a central axle, a yoke and a swivel base, a locking lever and an attachment means, wherein the attachment means of each of the two caster assemblies extends through the spacer blocks respectively; and
    a clamp assembly, wherein the swivel support device is configured to attach to each of two rear support legs of the wheelbarrow by the clamp assembly.

2. The device according to claim 1, wherein the attachment means being a screw.

3. The device according to claim 1, wherein the attachment means being a bolt and nut.

4. The device according to claim 1, wherein the attachment means being a rivet.

5. The device according to claim 1, wherein the device allows movement of the wheelbarrow wheel along a three-hundred sixty-degree (360°) path.

6. The device according to claim 1, wherein each of the caster assemblies has a height of six inches (6").

7. The device according to claim 1, wherein the connecting platform has a length of twenty-four (24) inches.

8. The device according to claim 1, wherein the connecting platform has a width of four (4) inches.

9. The device according to claim 1, wherein the connecting platform has a thickness of three-quarter (0.75) inch.

10. The device according to claim 1, wherein each of the spacer blocks are on an outside of each of the two rear support legs, respectively, of the wheelbarrow.

11. The device according to claim 1, wherein the clamp assembly comprises a "U" bolt.

12. The device according to claim 11, wherein the "U" bolt has two threaded end section sections.

13. The device according to claim 12, wherein the clamp assembly is configured to work with a backing plate to capture the connecting platform and the rear support legs of the wheelbarrow.

14. The device according to claim 13, wherein the "U" bolt further comprises two nuts, each of the nuts threaded on each of the threaded end sections.

* * * * *